D. C. BREWSTER.
Extension Spoke.
No. 84,164.
Patented Nov. 17, 1868.
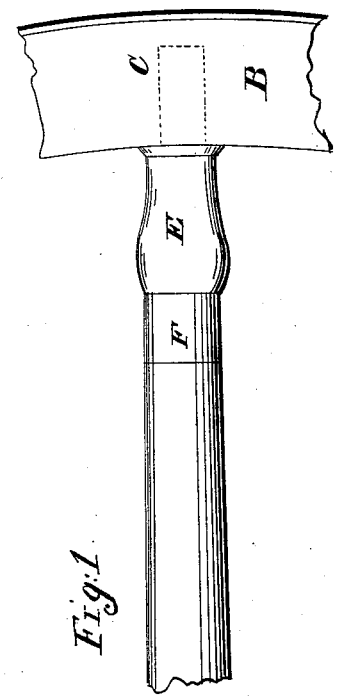
Fig. 1
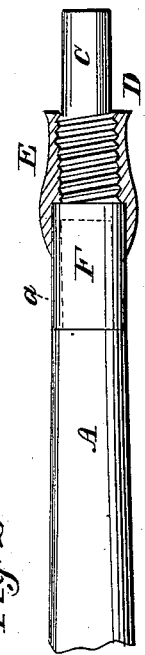
Fig. 2
Witnesses:
J. Holmes.
W. H. Burridge
Inventor:
D. C. Brewster

D. C. BREWSTER, OF KENT, OHIO.

Letters Patent No. 84,164, dated November 17, 1868.

IMPROVED EXTENSION-SPOKE.

The Schedule referred to in these Letters Patent and making part of the same.

*To all whom it may concern:*

Be it known that I, D. C. BREWSTER, of Kent, in the county of Portage, and State of Ohio, have invented certain new and useful Improvements in Extension-Spokes; and I do hereby declare that the following is a full and complete description of the same, reference being had to the accompanying drawings, making a part of this specification, in which—

Figure 1 is a view of the spoke, connected to a section of the felloe.

Figure 2 is a view of the spoke, detached.

Like letters of reference refer to like parts in the views.

In the drawing, A represents the spoke, and B, a section of the felloe and tire of a wheel.

The spoke A can be constructed in the ordinary way, with the extension secured on the tenon-end, as follows:

F represents a socket, in which is inserted the end of the spoke, as indicated by the dotted lines $a$, fig. 2.

The other end of this extension or socket forms a tenon, which is secured in the felloe in the usual way, indicated by the dotted lines C, fig. 1.

This tenon-end is provided with a screw, D, fig. 2, on which screws the thimble-nut E.

It is well known that, when wheels are constructed in the ordinary way, the tires, by constant use, become loose, and often drop off, thus causing a great deal of trouble and injury. But, with this extension-spoke, the trouble and expense of re-tiring is avoided, for, as the felloe shrinks, or the tire becomes loose, as is usually the case, the thimble-nut on each spoke can be screwed out, the end pressing against the felloe, as shown in fig. 1, thus expanding the felloe, and causing it to fit close to the tire, thus securing it to the wheel.

If necessary, the tire can be reset in the ordinary way, by first contracting the felloe, which is done by screwing the thimble-nut back, thus releasing the said felloe from the tire.

What I claim as my improvement, and desire to secure by Letters Patent, is—

The socket F, tenon C, screw D, and thimble-nut E, all constructed and arranged as shown and described, in combination with the spoke A and felloe B, substantially as and for the purpose set forth.

D. C. BREWSTER.

Witnesses:
   B. B. DE PEYSTER,
   WM. STEVENS.